Patented Apr. 21, 1925.

1,534,105

UNITED STATES PATENT OFFICE.

JOHN A. GANN, OF MIDLAND, MICHIGAN, ASSIGNOR TO THE DOW CHEMICAL COMPANY, OF MIDLAND, MICHIGAN, A CORPORATION OF MICHIGAN.

FLUX FOR MAGNESIUM AND ALLOYS THEREOF.

No Drawing.  Application filed August 1, 1923. Serial No. 655,143.

*To all whom it may concern:*

Be it known that I, JOHN A. GANN, a citizen of the United States, and a resident of Midland, county of Midland, and State of Michigan, have invented a new and useful Improvement in Fluxes for Magnesium and Alloys Thereof, of which the following is a specification, the principle of the invention being herein explained and the best mode in which I have contemplated applying that principle so as to distinguish it from other inventions.

The present improvements relate more particularly to an improved method of making a flux for use either in connection with the electrolytic production of magnesium or as a coating for the metal (or alloys thereof) in molten state in order to protect the same against oxidation, the composition of such flux forming the subject-matter of my copending application filed July 9, 1923, Serial No. 650,521 (since issued into Patent No. 1,519,128 under date of December 16, 1924).

It has been found that a flux which includes calcium chloride in addition to the standard magnesium chloride-sodium chloride flux is unusually satisfactory not only from the standpoint of protection afforded the molten metal but also because of the relatively low melting point of such flux and its limpid character when molten. In such standard flux the magnesium chloride and sodium chloride are used in approximately equi-molecular proportion, viz., approximately 60 per cent magnesium chloride and 40 per cent sodium chloride, and a satisfactory formula for the improved flux, containing calcium chloride as an additional ingredient, comprises a mixture of two-thirds of such standard flux and one-third of the calcium chloride.

Such standard magnesium chloride-sodium chloride flux may of course be readily prepared by combining anhydrous magnesium chloride with sodium chloride or common salt. If, however, the calcium chloride is then added to the mixture thus obtained, it is necessary first to dehydrate the same which ordinarily contains two molecules of water of crystallization. The object of the present invention is to provide an improved and simple method whereby the stated ingredients can be more readily prepared in proper dehydrated form and combined to form a flux of the desired triple chloride composition. To the accomplishment of such object the invention then consists of the steps hereinafter fully described and particularly pointed out in the claims, the following description setting forth but several of the various ways in which the principle of the invention may be carried out.

Dehydrated calcium chloride may be readily prepared by simply heating in an iron pot or other suitable receptacle a given amount of the chloride containing water of crystallization as aforesaid, such chloride being preferably in flake or granular form. According to my present procedure, the proportionate amount of sodium chloride is at once admixed with such calcium chloride before it is thus dehydrated and the mixture then heated until all water is driven off. Into such mixture while molten is then slowly fed the hydrated magnesium chloride-ammonium chloride double salt ($MgCl_2,NH_4Cl,6H_2O$) and the heating continued until the mixture is dehydrated and free from ammonium chloride. As is well known, such double ammonium magnesium chloride yields its water of crystallization upon heating much more readily than does the hydrated form of magnesium chloride alone; furthermore, the continued application of heat after the water of crystallization has been driven off will break up the double salt, ammonium chloride being evolved and anhydrous magnesium chloride left behind.

The amount of the hydrated double salt employed in the present process will of course be such as to leave the proper amount of such dehydrated magnesium chloride in the mixture to give the desired proportion of magnesium chloride, sodium chloride and calcium chloride.

As a matter of fact while considered preferable it is not necessarily essential that the magnesium chloride be added in the form of the aforesaid double salt but it may be added in the form of the partially dehydrated salt containing two molecules of water of crystallization ($MgCl_2.2H_2O$) to the molten anhydrous calcium chloride-sodium chloride mixture. The continued heating of the resultant triple chloride mixture will serve to drive off the water of crystallization from such magnesium chloride. Magnesium chloride containing even more water of crystallization may be similarly used, but this salt can be more advantageously dehydrated itself to the point where two molecules of water of crystallization remain.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of preparing a flux for use with molten magnesium and alloys thereof, the step which consists in heating a previously prepared molten mixture of sodium and calcium chlorides, together with a magnesium chloride salt retaining water of crystallization until such water is driven off.

2. In a method of preparing a flux for use with molten magnesium and alloys thereof, the steps which consist in adding to a previously prepared molten mixture of sodium and calcium chlorides a magnesium chloride salt retaining water of crystallization, and heating the resulting mixture until such water is driven off.

3. In a method of preparing a flux for use with molten magnesium and alloys thereof, the step which consists in heating a previously prepared molten mixture of sodium and calcium chlorides, together with the hydrated magnesium chloride-ammonium chloride double salt until the water of crystallization in the latter as well as the ammonium chloride is driven off.

4. In a method of preparing a flux for use with molten magnesium and alloys thereof, the steps which consist in adding to a previously prepared molten mixture of sodium and calcium chlorides the hydrated magnesium chloride-ammonium chloride double salt, and heating the resulting mixture until the water of crystallization in the latter as well as the ammonium chloride is driven off.

5. In a method of preparing a flux for use with molten magnesium and alloys thereof, the steps which consist in gradually adding to a previously prepared molten mixture of sodium and calcium chlorides the hydrated magnesium chloride-ammonium chloride double salt, and heating the resulting mixture until the water of crystallization in the latter as well as the ammonium chloride is driven off.

6. In a method of preparing a flux for use with molten magnesium and alloys thereof, the steps which consist in intermixing the proportionate amounts of sodium and calcium chlorides, such calcium chloride being in hydrated form, heating until such calcium chloride is dehydrated, adding to the molten mixture a magnesium chloride salt retaining water of crystallization, and heating the resulting mixture until such water is driven off.

7. In a method of preparing a flux for use with molten magnesium and alloys thereof, the steps which consist in intermixing the proportionate amounts of sodium and calcium chlorides, such calcium chloride being in hydrated form, heating until such calcium chloride is dehydrated, adding to the molten mixture the hydrated magnesium chloride-ammonium chloride double salt, and heating the resulting mixture until the water of crystallization in the latter as well as the ammonium chloride is driven off.

8. In a method of preparing a flux for use with molten magnesium and alloys thereof, the steps which consist in intermixing the proportionate amounts of sodium and calcium chlorides, such calcium chloride being in hydrated form, heating until such calcium chloride is dehydrated, gradually adding to the molten mixture the hydrated magnesium chloride-ammonium chloride double salt, and heating the resulting mixture until the water of crystallization in the latter as well as the ammonium chloride is driven off.

Signed by me, this 26 day of July, 1923.

JOHN A. GANN.